(12) United States Patent
Pan et al.

(10) Patent No.: US 8,949,664 B2
(45) Date of Patent: Feb. 3, 2015

(54) METHOD AND APPARATUS FOR PROVIDING INFORMATION CONSISTENCY IN DISTRIBUTED COMPUTING ENVIRONMENTS

(75) Inventors: Zane Zheng Yan Pan, Lexington, MA (US); Fujian Yang, Lexington, MA (US)

(73) Assignee: Nokia Corporation, Espoo (FI)

( * ) Notice: Subject to any disclaimer, the term of this patent is extended or adjusted under 35 U.S.C. 154(b) by 305 days.

(21) Appl. No.: 13/299,698

(22) Filed: Nov. 18, 2011

(65) Prior Publication Data

US 2013/0132771 A1 May 23, 2013

(51) Int. Cl.
*G06F 11/00* (2006.01)
*G06F 9/44* (2006.01)
*G06F 11/14* (2006.01)

(52) U.S. Cl.
CPC . *G06F 9/44* (2013.01); *G06F 11/14* (2013.01)
USPC .......................................................... 714/15

(58) Field of Classification Search
USPC ................. 714/6.23, 6.3, 20, 15; 711/162
See application file for complete search history.

(56) References Cited

U.S. PATENT DOCUMENTS

| | | | | |
|---|---|---|---|---|
| 6,052,695 A * | 4/2000 | Abe et al. ................................ 1/1 |
| 6,052,797 A * | 4/2000 | Ofek et al. ..................... 714/6.23 |
| 6,182,241 B1 * | 1/2001 | Ngai et al. ........................ 714/16 |
| 6,553,392 B1 * | 4/2003 | Mosher et al. ......................... 1/1 |
| 6,948,093 B2 * | 9/2005 | Flaherty et al. .................. 714/13 |
| 7,165,154 B2 * | 1/2007 | Coombs et al. ............... 711/162 |
| 7,386,755 B2 * | 6/2008 | Eguchi et al. ................. 714/6.12 |
| 7,398,366 B2 * | 7/2008 | Ohran et al. .................... 711/162 |
| 7,788,532 B2 * | 8/2010 | Kawamura ....................... 714/15 |
| 7,945,749 B2 * | 5/2011 | Shinozaki et al. ............. 711/162 |
| 8,024,603 B2 * | 9/2011 | Kono et al. ..................... 714/6.2 |
| 8,055,943 B2 * | 11/2011 | Edel et al. ......................... 714/20 |
| 8,335,771 B1 * | 12/2012 | Natanzon et al. ............. 707/684 |
| 2004/0024853 A1 * | 2/2004 | Cates et al. .................... 709/223 |
| 2004/0128326 A1 * | 7/2004 | LeCrone et al. .............. 707/200 |
| 2004/0260901 A1 * | 12/2004 | Yamagami et al. ........... 711/162 |
| 2005/0081099 A1 * | 4/2005 | Chang et al. .................... 714/15 |
| 2008/0034231 A1 * | 2/2008 | Ginter et al. ................... 713/194 |
| 2008/0183973 A1 | 7/2008 | Aguilera et al. |
| 2008/0270831 A1 * | 10/2008 | Niwa ............................... 714/15 |
| 2009/0177658 A1 * | 7/2009 | Brantner et al. ................... 707/8 |
| 2013/0042156 A1 * | 2/2013 | Srinivasan et al. .............. 714/54 |

FOREIGN PATENT DOCUMENTS

WO   WO 2010/148415 A1   12/2010

OTHER PUBLICATIONS

J. H. Saltzer et al., "Principles of Computer System Design ", Massachusetts Institute of Technology, pp. 1-40.
J. M. Paluska et al., "Footloose: A Distributed Data Buffer for Primarily Disconnected Operation", pp. 1-10.

* cited by examiner

*Primary Examiner* — Yolanda L Wilson
(74) *Attorney, Agent, or Firm* — Ditthavong & Steiner, PC

(57) ABSTRACT

An approach is provided for providing information consistency in distributed computing environments. An information consistency platform determines one or more finite state machines based, at least in part, on one or more states of one or more respective steps of at least one update operation operating on one or more data items, wherein the one or more finite state machines executes, at least in part, the at least one update operation, one or more other operations, or a combination thereof on the one or more data items.

18 Claims, 10 Drawing Sheets

METHOD AND APPARATUS FOR PROVIDING INFORMATION CONSISTENCY IN DISTRIBUTED COMPUTING ENVIRONMENTS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications and the information stored by those applications is a major challenge of interoperability. This can be achieved through numerous, individual and personal information spaces in which persons, groups of persons, etc. can place, share, interact and manipulate (or program devices to automatically perform the planning, interaction and manipulation of) webs of information with their own locally agreed semantics without necessarily conforming to an unobtainable, global whole.

Such distributed computing systems involve numerous information transactions among various distributed sources. In many occasions, information may be transferred, updated, inserted or deleted to and from multiple distributed information sources, while at the same time requests for information may be issued and processed at any location. In such occasions, consistency of information may become an issue. For example, if a request for information is received and processed at the same time as a deleting process for the same information is underway, the requester may receive an erroneous response to its request.

SOME EXAMPLE EMBODIMENTS

Therefore, there is a need for an approach for providing information consistency in distributed computing environments.

According to one embodiment, a method comprises determining one or more finite state machines based, at least in part, on one or more states of one or more respective steps of at least one update operation operating on one or more data items, wherein the one or more finite state machines executes, at least in part, the at least one update operation, one or more other operations, or a combination thereof on the one or more data items.

According to another embodiment, an apparatus comprises at least one processor, and at least one memory including computer program code for one or more computer programs, the at least one memory and the computer program code configured to, with the at least one processor, cause, at least in part, the apparatus to determine one or more finite state machines based, at least in part, on one or more states of one or more respective steps of at least one update operation operating on one or more data items, wherein the one or more finite state machines executes, at least in part, the at least one update operation, one or more other operations, or a combination thereof on the one or more data items.

According to another embodiment, a computer-readable storage medium carries one or more sequences of one or more instructions which, when executed by one or more processors, cause, at least in part, an apparatus to determine one or more finite state machines based, at least in part, on one or more states of one or more respective steps of at least one update operation operating on one or more data items, wherein the one or more finite state machines executes, at least in part, the at least one update operation, one or more other operations, or a combination thereof on the one or more data items.

According to another embodiment, an apparatus comprises means for determining one or more finite state machines based, at least in part, on one or more states of one or more respective steps of at least one update operation operating on one or more data items, wherein the one or more finite state machines executes, at least in part, the at least one update operation, one or more other operations, or a combination thereof on the one or more data items.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing information consistency in distributed computing environments are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
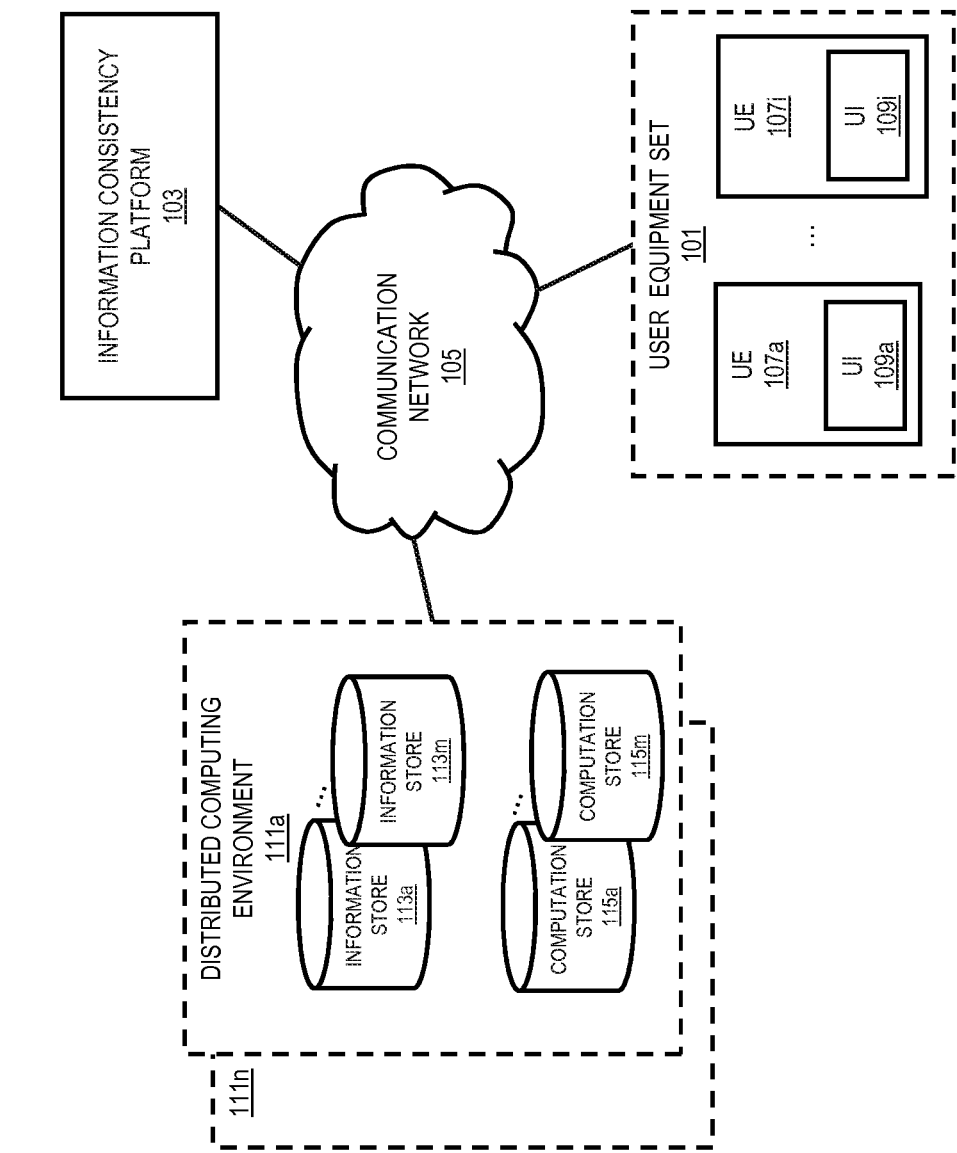
FIG. 1 is a diagram of a system capable of providing information consistency in distributed computing environments, according to one embodiment.

FIG. 1 is a diagram of a system capable of providing information consistency in distributed computing environments, according to one embodiment. In one embodiment, in a distributed computing system 100 data is repeatedly moved from one place to another while at the same time the data is being accessed and used. In such environment, consistency of the data is very important in order to ensure accurate services. For example, a data update operation may modify the storage of data items.

In one embodiment, the clients of a distributed computing system 100 may send concurrent requests to the system and the system should execute clients' requests. For example, a deletion request may be sent at the same time as an update operation is being processed.

In one embodiment, the system 100 should be capable of providing the current version of the requested data to a client (e.g., not an old copy and a new copy). Additionally, in embodiments where a client successfully completes a data update operation, the system 100 guarantees that any requests for the information, following the update operation, will return the updated version of the data or no data at all (e.g., when data has been deleted after update).

In one embodiment, when a client is given an exceptional update privilege for data, other clients will not have access to the updated data. In this embodiment, from point of view of other clients the old version of data (before update is applied) is provided.

In one embodiment, if for any reason a client fails during the execution of a data update operation, the distributed computing environment 111a-111n will keep either the old version of the data, or the new (updated) version of the data, but not both versions.

In one embodiment, when a client is provided with a new version of data, the distributed computing environment 111a-111n guarantees that it will never provide the old version of the data to the client in future requests.

In one embodiment, the data update operation is not an atomic operation, but is composed of more than one operations, for example, a delete operation to delete the old data with an old key, and an add operation for adding new data to a new key. However, there is no guarantee that either both operations succeed or both fail. Therefore, as a result, the distributed computing environment 111a-111n may contain duplicated data or face data loss due to unexpected operation failures.

To address this problem, a system 100 of FIG. 1 introduces the capability to provide information consistency in distributed computing environments. In one embodiment, a finite state machine is designed for execution of every operation, wherein the finite state machine includes states for every step of an operation. The states of a finite state machine keep track of the execution of an operation at every step of the execution.

It is noted that a finite state machine is conceived as an abstract machine that can be in one of a finite number of states. The machine is in only one state at a time and the state it is in at any given time is called the current state. The finite state machine can change from one state to another when initiated by a triggering event or condition, this is called a transition. A particular finite state machine is defined by a list of the possible states it can transition to from each state, and the triggering condition for each transition.

In one embodiment, the states of a finite state machine and the triggering conditions for transition among those states provide information needed for the recovery of failed operations, failed steps of the operations, or a combination thereof and enable providing data consistency.

In one embodiment, in a highly distributed computing environment such as, for example, a computation cloud, the whole distributed computing environment 111a-111n may include multiple isolated information stores. For example, a distributed computing environment 111a-111n of FIG. 1 may include information stores 113a-113m which may include databases, key-value stores (e.g., schema-less data consisting of strings representing the key and the actual data), or a combination thereof. These information stores may be located in various distant geo-locations.

In one embodiment, a common operation of such distributed computation environment is to update data that is stored in the distributed computing environment 111a-111n. For example, a user of a UE 107a-107i may want to update his current location while travelling. In this embodiment, the distributed computing environment 111a-111n may move the data from one information store to another information store, for example for efficient accessibility, to an information store close to the current location of the UE 107a-107i.

In one embodiment, moving data items may comprise multiple steps such as, for example, removing the data from its current information store 113a-113m and subsequently, inserting the data into another information store 113a-113m.

However, during the move operation, the distributed computing environment 111a-111n cannot be blocked or stopped. The distributed computing environment 111a-111n will be running and providing services to its users.

In one embodiment, a user of a UE 107a-107i may be reading the data while the distributed computing environment 111a-111n is in the middle of executing the move operation. In this embodiment, the information consistency platform 103 guarantees data consistency during the move operation.

In one embodiment, the data that is in the middle of being updated cannot be missing from the distributed computing environment 111a-111n. It means that, if a user of a UE 107a-107i wants to read the data, the distributed computing environment 111a-111n may not respond with "data not found" in any case.

In one embodiment, the distributed computing environment 111a-111n may not return two different versions of the data to a requesting user, for example, an old version before the update and a new version after the update.

In one embodiment, the distributed computing environment 111a-111n may return the old version of the data to a requesting user during the move operation; however, once the new version of the data is available, the distributed computing environment 111a-111n may not return the old version of the data from that point on.

It is noted that in older systems wherein the storages were databases all deployed in the same local area network, a distributed computing environment could implement a transaction manager to guarantee the data consistency during a move operation. In such environments, with proper database transaction isolation level settings, the distributed computing environment can ensure that the intermediate state (e.g., the state between removing data and inserting data) is not exposed to any user that is reading the data. In this case, the removing step and the inserting step are combined into one atomic step so that the distributed computing environment may either show the state before the atomic step or after the atomic step. In this example, data consistency is preserved by the databases transaction.

However, in highly distributed computing environment such as computation clouds, many of the information stores 113a-113m may not be databases and may be deployed across wide area networks. In this case, building a distributed transaction manager is not only impossible but also not practical. This is the reason that most of the computation clouds today do not guarantee the data consistency during data update operation. The clouds pass this hard problem to their clients and most clients pass the problem to the end users. For example, some applications provided via a distributed computing environment may provide conflicting data sets to the end users of UEs 107a-107i which is certainly not a desirable behavior. The approach provided for providing information consistency in distributed computing environments addresses this problem.

As shown in FIG. 1, the system 100 comprises a set 101 of user equipments (UEs) 107a-107i having connectivity to an information consistency platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). These contexts may require certain sets of media dependent computation closures, which may affect the service, for example the bit error rate, etc. Additionally, each UI element may be bound to a context/process by granular distribution. In one embodiment, granular distribution enables processes to be implicitly or explicitly migrated between devices, computation clouds, and other infrastructure. Additionally, a UE 107a-107i may be a mobile device with embedded Radio Frequency (RF) tag system of device to device connections such that computational operations and content can be locally transmitted among devices.

As seen in FIG. 1, a user of UEs 107a-107i may own, use, or otherwise have access to various pieces of information and computations distributed over one or more distributed computing environments 111a-111n in information stores 113a-113m and computation stores 115a-115m. In one embodiment, the user may be an application developer that uses a UE 107a-107i to connect to the distributed computing environment 111a-111n not only for accessing the services provided for end users but also for activities such as developing, distributing, processing, and aggregating various computations and information.

By way of example, the UEs 107a-107i, and the information consistency platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
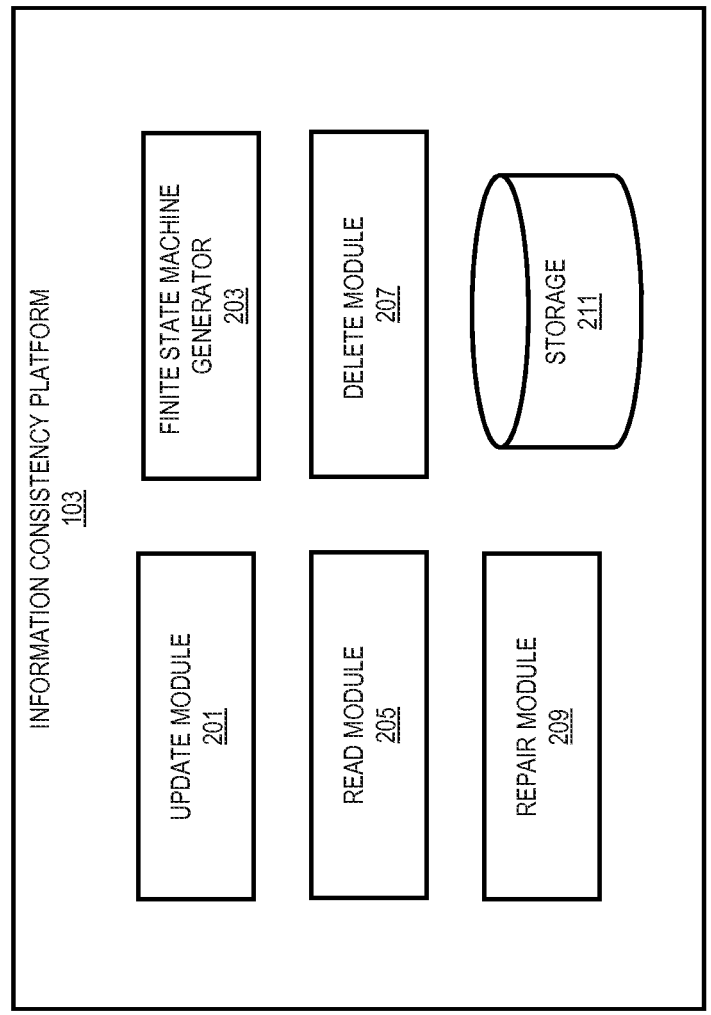
FIG. 2 is a diagram of the components of an information consistency platform, according to one embodiment.

FIG. 2 is a diagram of the components of an information consistency platform, according to one embodiment. By way of example, the information consistency platform 103 includes one or more components for providing information consistency in distributed computing environments. It is contemplated that the functions of these components may be combined in one or more components or performed by other components of equivalent functionality. In this embodiment, the information consistency platform 103 includes an update module 201, a finite state machine generator 203, a read module 205, a delete module 207, a repair module 209, and a storage 211.

Figure 3:
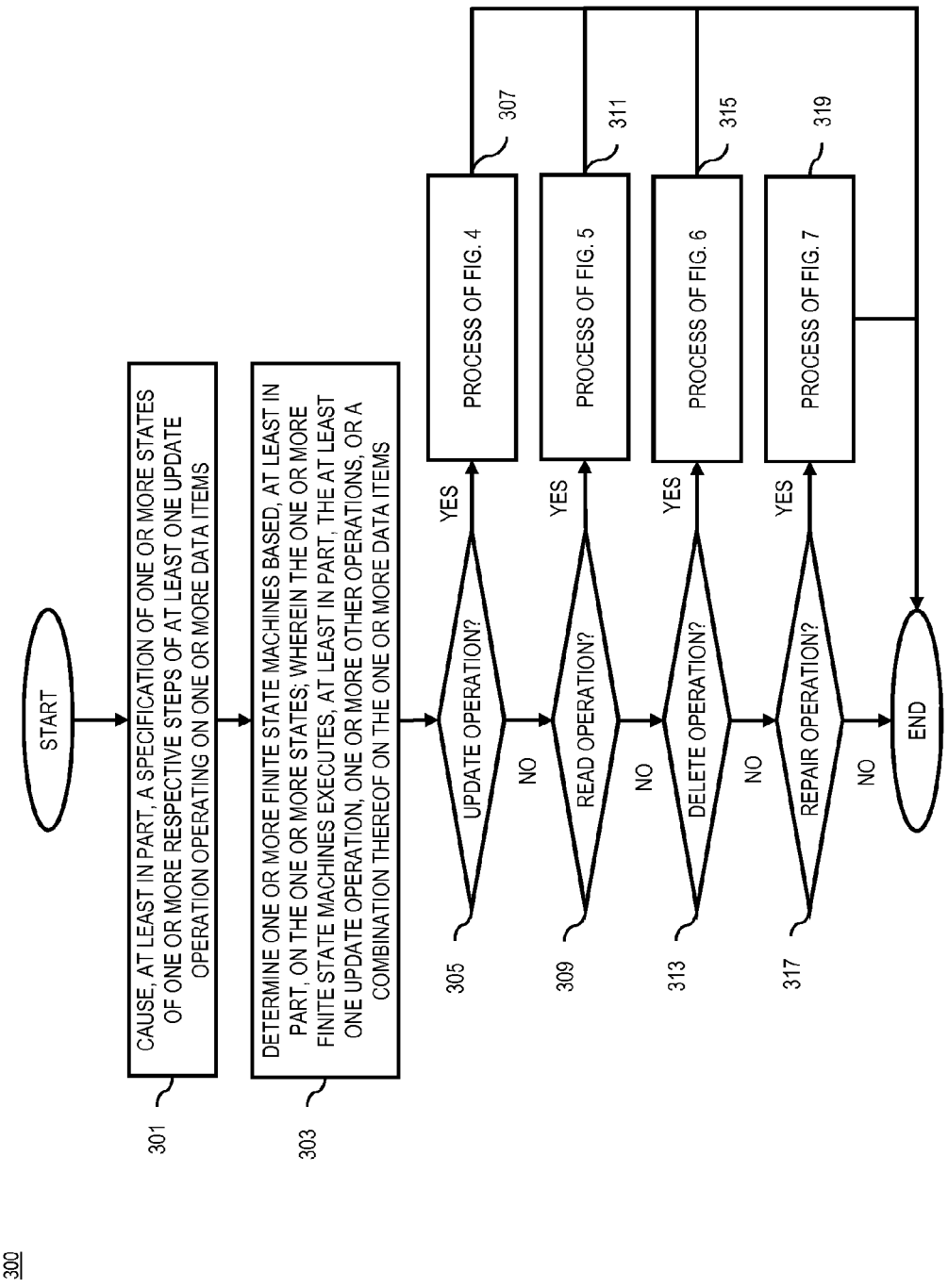
FIG. 3 is a flowchart of a process for providing information consistency in distributed computing environments, according to one embodiment.
Figure 4:
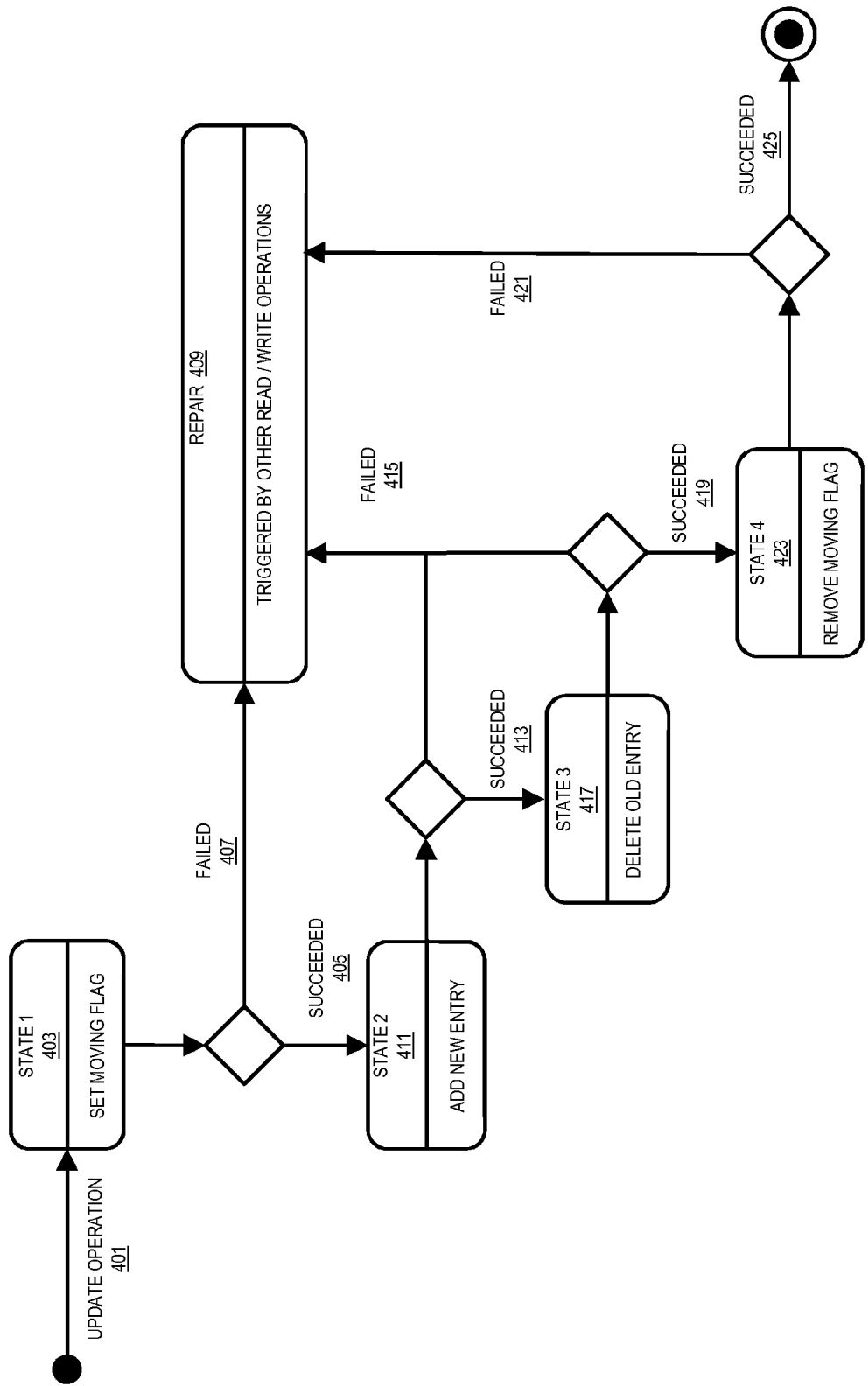
FIG. 4 is a diagram of an update operation, according to one embodiment.
Figure 5:
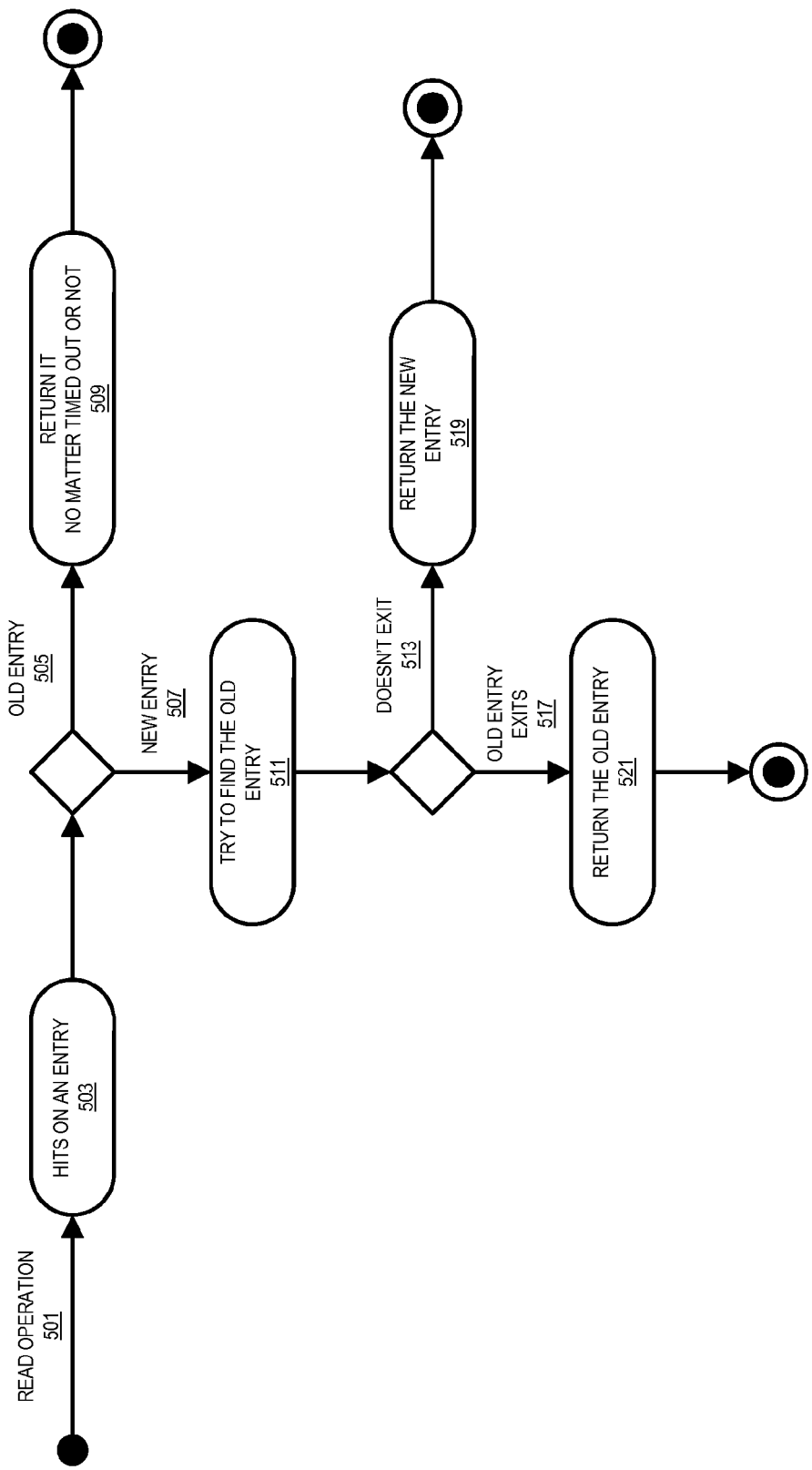
FIG. 5 is a diagram of a read operation, according to one embodiment.
Figure 6:
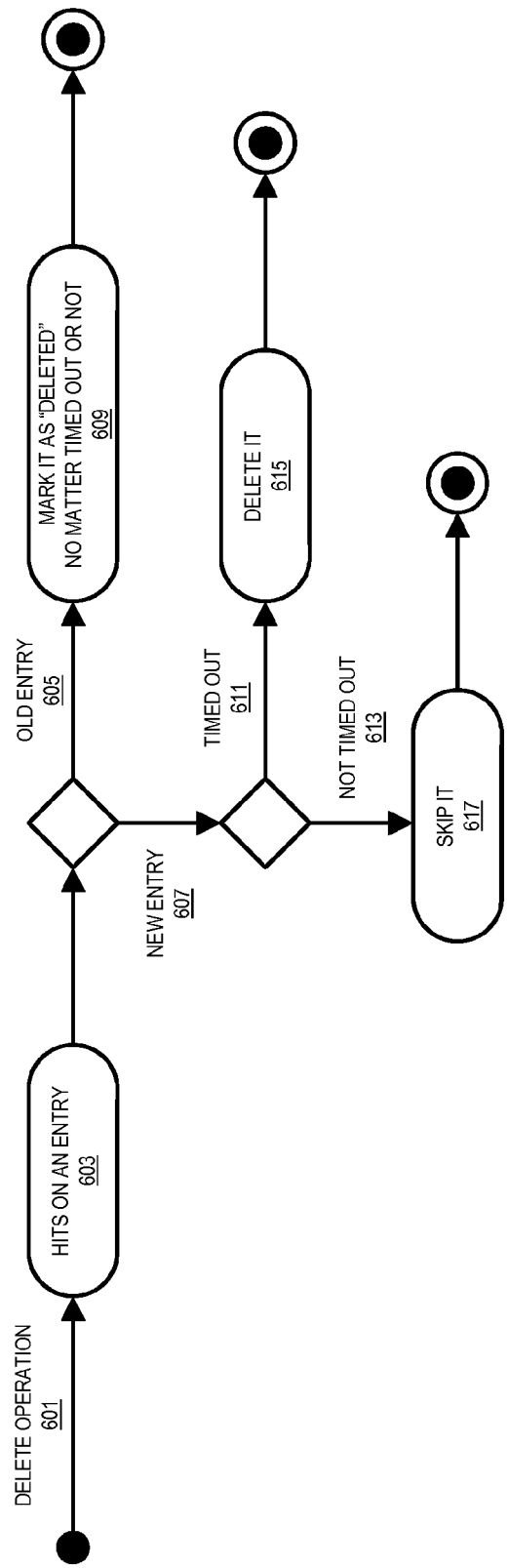
FIG. 6 is a diagram of a delete operation, according to one embodiment.
Figure 7:
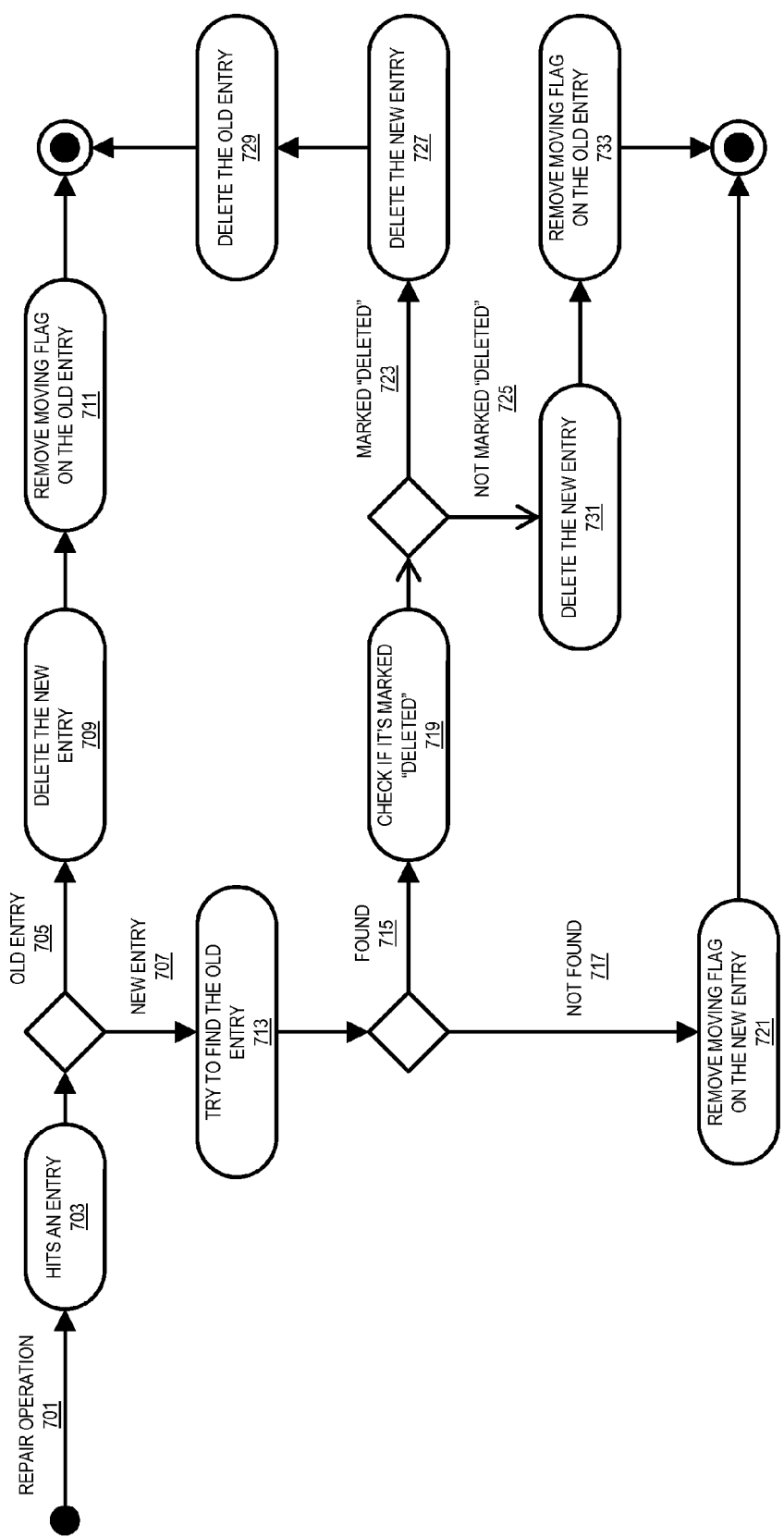
FIG. 7 is a diagram of a repair operation, according to one embodiment.

FIG. 2 is described with respect to FIGS. 3 to 7, wherein FIG. 3 is a flowchart of a process for providing information consistency in distributed computing environments, FIG. 4 is a diagram of an update operation, FIG. 5 is a diagram of a read operation, FIG. 6 is a diagram of a delete operation, and FIG. 7 is a diagram of a repair operation, according to various embodiments.

In one embodiment, per step 301 of flowchart 300 of FIG. 3, the update module 201 causes, at least in part, a specification of one or more states of one or more respective steps of at least one update operation operating on one or more data items from the distributed computing environment 111a-111n.

In one embodiment, per step 303 of FIG. 3, the finite state machine generator 203 determines one or more finite state machines based, at least in part, on the one or more states specified by the update module 201. The one or more finite state machines execute, at least in part, the at least one update operation, one or more other operations (e.g., read, delete, repair, etc.), or a combination thereof on the one or more data items.

In one embodiment, the information consistency platform 103 is equipped with mechanisms (e.g. moving flags) to differentiate old data entries from new data entries associated with data items from the distributed computing environments 111a-111n.

In one embodiment, a first state of the one or more states of one or more steps of a data operation is a successful setting of one or more moving flags. The moving flags may be set on one or more old entries of the one or more data items, one or more new entries of the one or more data items, or a combination thereof.

In one embodiment, a second state of the one or more states of one or more steps of a data operation is a successful addition of the one or more new entries, a third state of the one or more states is a successful deletion of the one or more old entries, and a fourth state of the one or more states is a successful removal of the one or more moving flags from the one or more new entries.

In one embodiment, per step 305 of FIG. 3, if an update operation is operated, per step 307 the process of FIG. 4 is executed. As seen in FIG. 4, per step 401 an update operation is initiated.

In one embodiment, per step 403, the first step as previously described, the finite state machine generator 203 sets a moving flag on both the old and the new entries.

In one embodiment, a timestamp can be used as the moving flag by the finite state machine generator 203, so that the finite state machine generator 203 can obtain the elapsed time from the time the flag was set. The finite state machine generator 203 can use the elapsed time to determine whether the flag is timed-out. In case the moving flag is timed-out, this indicates that the update operation has failed. The time-out threshold may be set to a certain number (e.g. 2 seconds) to insure that during which time the operation is completed.

In one embodiment, if the moving flag is successfully set (arrow 405) per step 411, the second state as previously described, the update module 201 adds the new entry to the targeted information store 113a-113m.

In one embodiment, if the adding of the new entry of step 411 is successfully operated (arrow 413), per step 417, the third step as previously described, the delete module 207 deletes the old entry from the information store 113a-113m.

In one embodiment, if the deletion of the old entry of step 417 is successfully operated (arrow 419), per step 423, the fourth step as previously described, the finite state machine generator 203 removes the moving flag from the new entry.

In one embodiment, if any of the operations of setting of the moving flag fails, addition of new entry, deletion of the old entry, or removal of the moving tag fail (arrows 407, 415, and 421); per step 409 a repair operation is initiated by the repair module 209. However, if all the states are successfully completed, the operation ends as shown by arrow 425.

In one embodiment, per step 309 of FIG. 3, if a read operation is operated, per step 311 the process of FIG. 5 is executed. As seen in FIG. 5, per step 501 a read operation is initiated.

In one embodiment, per step 503 of FIG. 5, the read module 205 determines whether the entry to be read is an old entry or a new entry. In one embodiment, if at least one update operation has failed and the one or more moving flags of the one or more old entries are expired, the read module 205 causes, at least in part, per step 509 of FIG. 5, a return of the one or more old entries in response to the read operation.

In another embodiment, wherein a read operation is operated and at least one update operation is ongoing, if the one or more moving flags of the one or more old entries 505 are not expired, the read module 205 causes, at least in part, again per step 509, a return of the one or more old entries in response to the read operation.

In yet another embodiment, wherein a read operation is operated and at least one update operation is ongoing, if the one or more moving flags are set for one or more new entries 507, per step 511 the read module 205 searches for old entries. If old entries exist (arrow 517) the read module 205 causes, at least in part, a return of the one or more old entries, per step 521. Otherwise, if old entries do not exist (arrow 513) the read module 205, per step 519, returns the one or more new entries.

In one embodiment, per step 313 of FIG. 3, if a delete operation is operated, per step 315 the process of FIG. 6 is executed. As seen in FIG. 6, per step 601 a delete operation is initiated.

In one embodiment, per step 603 of FIG. 6, the delete module 207 determines whether the entry to be deleted is an old entry or a new entry. In one embodiment, if an old entry is being deleted (arrow 605), the delete module 207 determines that the one or more moving flags are set for the one or more old entries and per step 609 the delete module 207 causes, at least in part, a marking of the one or more old entries for deletion without deleting the one or more old entries.

In another embodiment, if a new entry is being deleted (arrow 607), the delete module 207 determines that the one or more moving flags are set for the one or more new entries. If the one or more moving flags are expired (arrow 611), the delete module 207 causes, at least in part, a deletion of the one or more new entries, per step 615. However, if the moving flags are not expired (arrow 613) the delete module 207 causes, at least in part, per step 617, a skipping of the delete operation.

In one embodiment, per step 317 of FIG. 3, if a repair operation is operated, per step 319 the process of FIG. 7 is executed. As seen in FIG. 7, per step 701 a repair operation is initiated.

In one embodiment, per step 703 of FIG. 7, the repair module 209 determines whether the entry to be repaired is an old entry or a new entry. In one embodiment, if an old entry is being repaired (arrow 705), the repair module 209 determines that at least one update operation has failed if the one or more moving flags of the one or more old entries is not expired, and per step 709 the repair module 209 causes, at least in part, a deletion of the one or more new entries.

In one embodiment, per step 711, the finite state machine generator 203 removes the moving flag from the old entry.

In another embodiment, if new entries are being repaired (arrow 707), the repair module 209 searches, per step 713, for old entries. If old entries are not found (arrow 717) the finite state machine generator 203 removes the moving flag from the new entries, per step 721. Otherwise, if old entries are found (arrow 715), per step 719 the repair module 209 checks whether the old entries are marked as deleted. If the old entries are marked as deleted (arrow 723) per step 727 the repair module 209 deletes the new entries and per step 729 deletes the old entries. However, if the old entries are not marked as deleted (arrow 725) per step 731 the repair module 209 deletes the new entries and per step 733 removes the moving flags from the old entries.

In one embodiment, the repair module 209 determines that at least one update operation has failed if the one or more moving flags of the one or more old entries is expired, and causes, at least in part, a deletion of the one or more old entries, the one or more new entries, or a combination thereof (steps 727 and 729) based, at least in part, on the one or more states, the one or more moving flags, or a combination thereof.

In various embodiments, any of the components of the information consistency platform 103 may store the data associated with the operations, the old entries, the new entries, the moving flags, or a combination thereof, in storage 211, in information stores 113a-113m, or a combination thereof.

The processes described herein for providing information consistency in distributed computing environments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
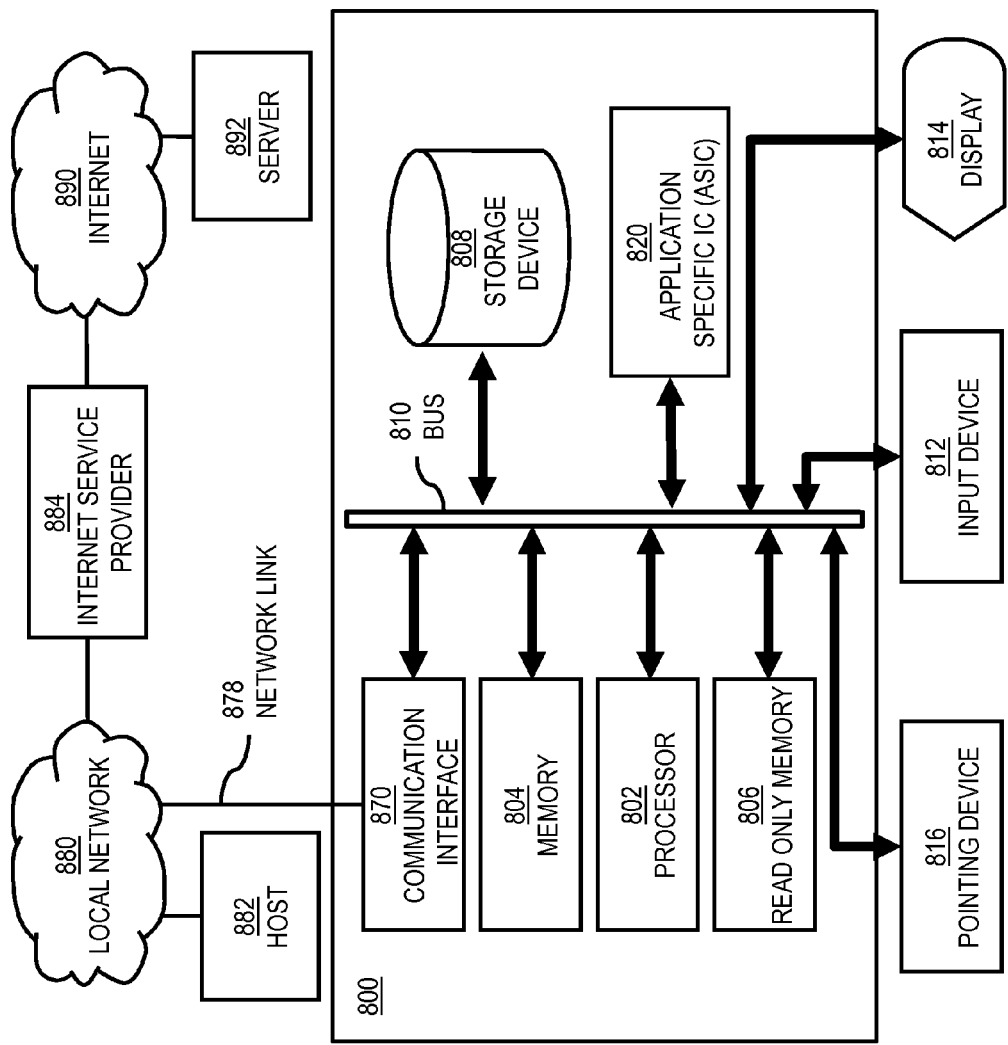
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide information consistency in distributed computing environments as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing information consistency in distributed computing environments.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing information consistency in distributed computing environments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing information consistency in distributed computing environments. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing information consistency in distributed computing environments, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing information consistency in distributed computing environments to the UEs 107a-107i.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
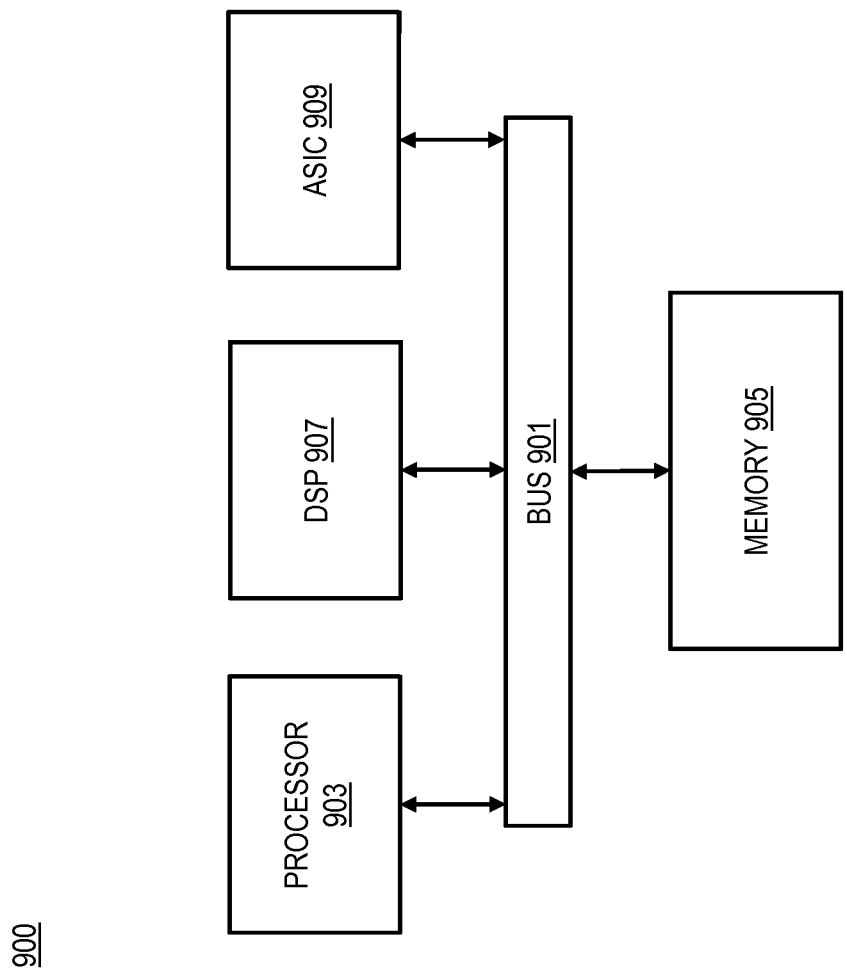
FIG. 9 is a diagram of a chip set that can be used to implement an embodiment of the invention.

FIG. 9 illustrates a chip set or chip 900 upon which an embodiment of the invention may be implemented. Chip set 900 is programmed to provide information consistency in distributed computing environments as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing information consistency in distributed computing environments.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide information consistency in distributed computing environments. The memory 905 also stores the data associated with or generated by the execution of the inventive steps.

Figure 10:
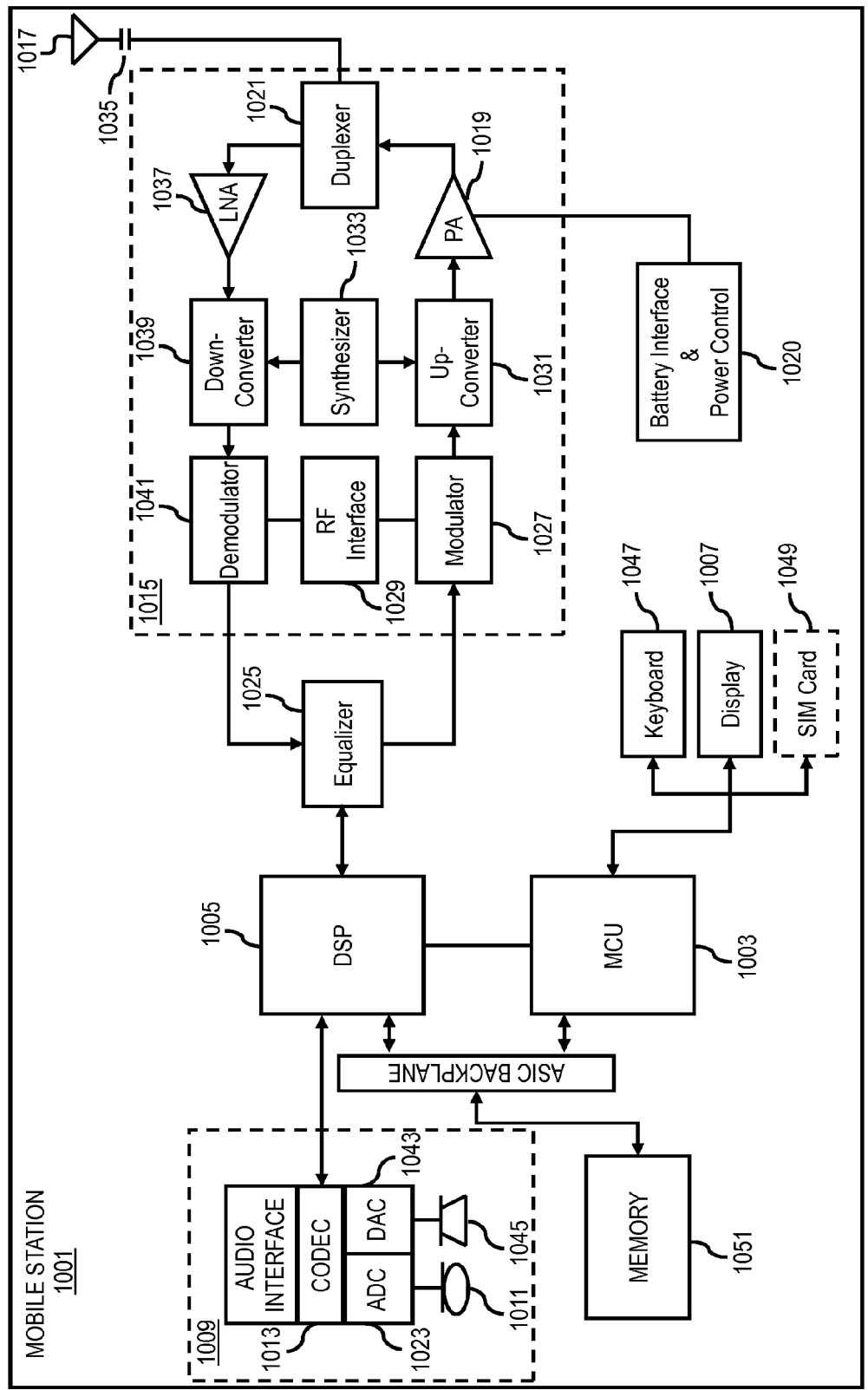
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing information consistency in distributed computing environments. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing information consistency in distributed computing environments. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide information consistency in distributed computing environments. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following: at least one determination of one or more finite state machines based, at least in part, on one or more states of one or more respective steps of at least one update operation operating on one or more data items; and at least one determination that one or more moving flags associated with the one or more states has not expired, wherein the one or more finite state machines executes, at least in part, the at least one update operation, one or more other operations, or a combination thereof on the one or more data items, wherein the one or more other operations is a read operation, the method further comprising: at least one determination that the at least one update operation has failed if the one or more moving flags of the one or more old entries is expired; and a return of the one or more old entries in response to the read operation.

2. A method of claim 1, wherein a first state of the one or more states is a successful setting of the one or more moving flags on (a) one or more old entries of the one or more data items, (b) one or more new entries of the one or more data items, or (c) a combination thereof; wherein a second state of the one or more states is a successful addition of the one or more new entries; wherein a third state of the one or more states is a successful deletion of the one or more old entries; and wherein a fourth state of the one or more states is a successful removal of the one or more moving flags from the one or more new entries.

3. A method of claim 2, wherein the one or more other operations is a read operation, and wherein the (1) data and/or (2) information and/or (3) at least one signal are further based, at least in part, on the following:
at least one determination that the at least one update operation is ongoing if the one or more moving flags of the one or more old entries are not expired; and
a return of the one or more old entries in response to the read operation.

4. A method of claim 2, wherein the one or more other operations is a read operation, and wherein the (1) data and/or (2) information and/or (3) at least one signal are further based, at least in part, on the following:
at least one determination that the at least one update operation is ongoing if the one or more moving flags are set for the one or more new entries;
a return of the one or more old entries if the one or more old entries exist, or the one or more new entries if the one or more old entries do not exist.

5. A method of claim 2, wherein the one or more other operations is a delete operation, and wherein the (1) data and/or (2) information and/or (3) at least one signal are further based, at least in part, on the following:
at least one determination that the one or more moving flags are set for the one or more old entries; and
a marking of the one or more old entries for deletion without deleting the one or more old entries.

6. A method of claim 2, wherein one or more other operations is a delete operation, and wherein the (1) data and/or (2) information and/or (3) at least one signal are further based, at least in part, on the following:
at least one determination that the one or more moving flags are set for the one or more new entries; and
a deletion of the one or more new entries if the one or more moving flags are expired, or a skipping of the delete operation if the one or more moving flags are not expired.

7. A method of claim 2, wherein the one or more other operations is a repair operation, and wherein the (1) data and/or (2) information and/or (3) at least one signal are further based, at least in part, on the following:
at least one determination that the at least one update operation has failed if the one or more moving flags of the one or more old entries is not expired; and
a deletion of the one or more new entries.

8. A method of claim 2, wherein the one or more other operations is a repair operation, and wherein the (1) data and/or (2) information and/or (3) at least one signal are further based, at least in part, on the following:
at least one determination that the at least one update operation has failed if the one or more moving flags of the one or more old entries is expired; and
a deletion of the one or more old entries, the one or more new entries, or a combination thereof based, at least in part, on the one or more states, the one or more moving flags, or a combination thereof.

9. A method of claim 2, wherein the one or more moving flags include, at least in part, a timestamp information, and wherein an expiration of the one or more moving flags is determined based, at least in part, on a comparison of the timestamp information against a time period during which the at least one update operation, the one or more other operations or a combination thereof are estimated to be completed to a predetermined probability.

10. An apparatus comprising: at least one processor; and at least one memory including computer program code for one or more programs, the at least one memory and the computer program code configured to, with the at least one processor, cause the apparatus to perform at least the following, determine one or more finite state machines based, at least in part, on one or more states of one or more respective steps of at least one update operation operating on one or more data items; and determine that one or more moving flags associated with the one or more states has not expired, wherein the one or more finite state machines executes, at least in part, the at least one update operation, one or more other operations, or a combination thereof on the one or more data items, wherein the one or more other operations is a read operation, the apparatus is further caused to: determine that the at least one update operation has failed if the one or more moving flags of the one or more old entries is expired; and cause, at least in part, a return of the one or more old entries in response to the read operation.

11. An apparatus of claim 10, wherein a first state of the one or more states is a successful setting of the one or more moving flags on (a) one or more old entries of the one or more data items, (b) one or more new entries of the one or more data items, or (c) a combination thereof; wherein a second state of the one or more states is a successful addition of the one or more new entries; wherein a third state of the one or more states is a successful deletion of the one or more old entries; and wherein a fourth state of the one or more states is a successful removal of the one or more moving flags from the one or more new entries.

12. An apparatus of claim 11, wherein the one or more other operations is a read operation, the apparatus is further caused to:
    determine that the at least one update operation is ongoing if the one or more moving flags of the one or more old entries are not expired; and
    cause, at least in part, a return of the one or more old entries in response to the read operation.

13. An apparatus of claim 11, wherein the one or more other operations is a read operation, the apparatus is further caused to:
    determine that the at least one update operation is ongoing if the one or more moving flags are set for the one or more new entries;
    cause, at least in part, a return of the one or more old entries if the one or more old entries exist, or the one or more new entries if the one or more old entries do not exist.

14. An apparatus of claim 11, wherein the one or more other operations is a delete operation, the apparatus is further caused to:
    determine that the one or more moving flags are set for the one or more old entries; and
    cause, at least in part, a marking of the one or more old entries for deletion without deleting the one or more old entries.

15. An apparatus of claim 11, wherein one or more other operations is a delete operation, the apparatus is further caused to:
    determine that the one or more moving flags are set for the one or more new entries; and
    cause, at least in part, a deletion of the one or more new entries if the one or more moving flags are expired, or a skipping of the delete operation if the one or more moving flags are not expired.

16. An apparatus of claim 11, wherein the one or more other operations is a repair operation, the apparatus is further caused to:
    determine that the at least one update operation has failed if the one or more moving flags of the one or more old entries is not expired; and
    cause, at least in part, a deletion of the one or more new entries.

17. An apparatus of claim 11, wherein the one or more other operations is a repair operation, the apparatus is further caused to:
    determine that the at least one update operation has failed if the one or more moving flags of the one or more old entries is expired; and
    cause, at least in part, a deletion of the one or more old entries, the one or more new entries, or a combination thereof based, at least in part, on the one or more states, the one or more moving flags, or a combination thereof.

18. An apparatus of claim 11, wherein the one or more moving flags include, at least in part, a timestamp information, and wherein an expiration of the one or more moving flags is determined based, at least in part, on a comparison of the timestamp information against a time period during which the at least one update operation, the one or more other operations or a combination thereof are estimated to be completed to a predetermined probability.

* * * * *